United States Patent Office 2,768,942
Patented Oct. 30, 1956

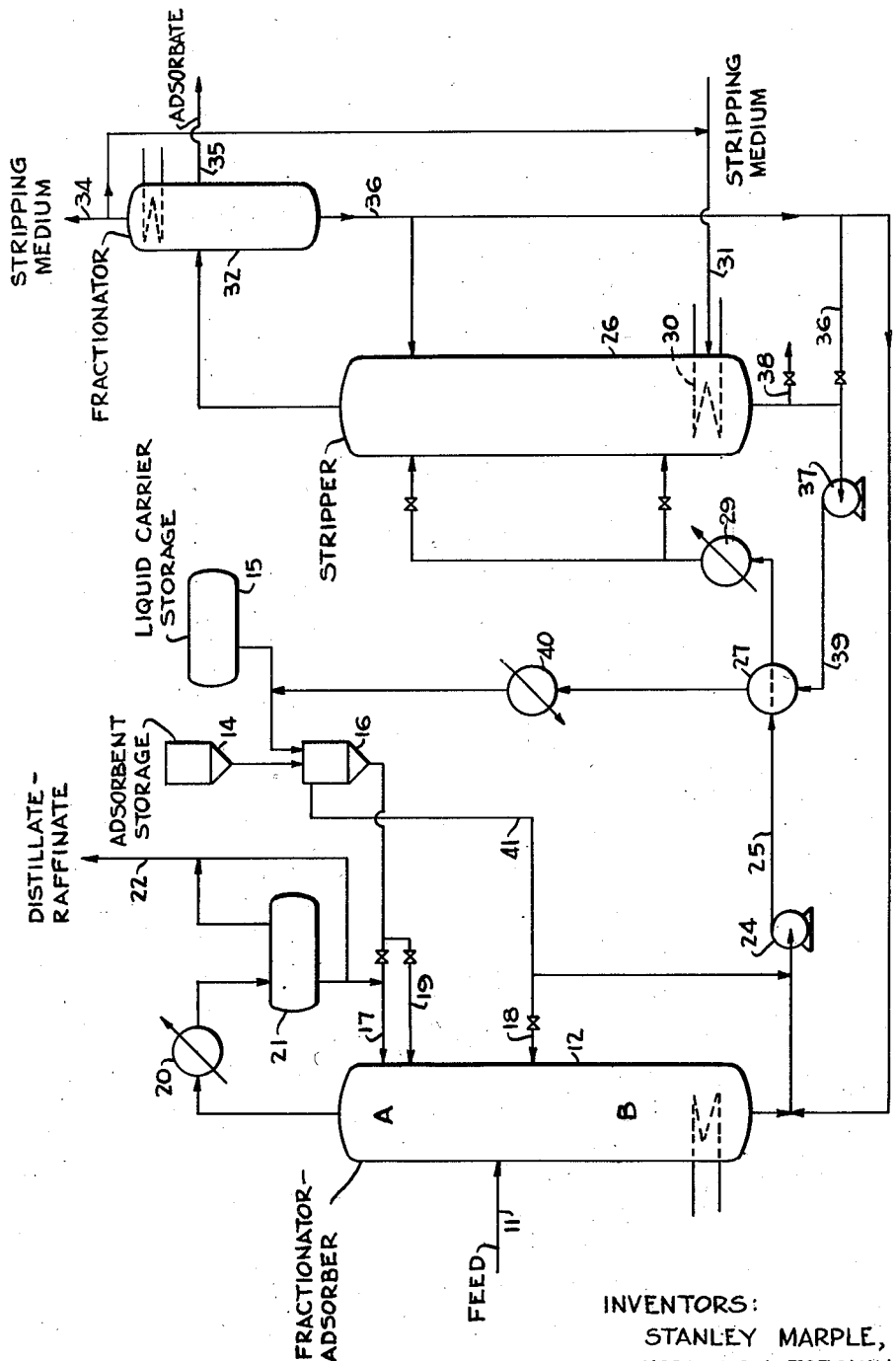

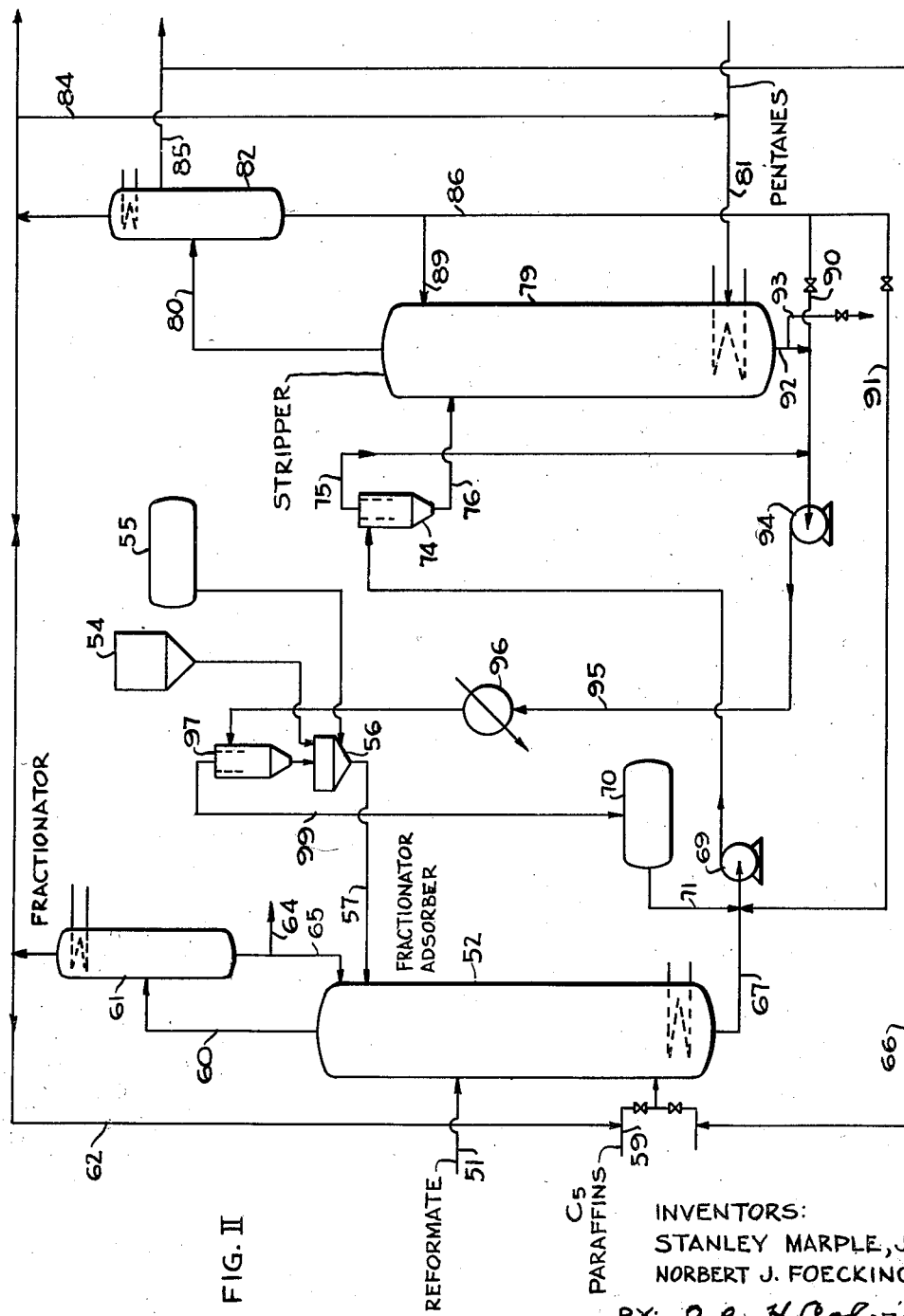

2,768,942

ADSORPTIVE DISTILLATION PROCESS

Stanley Marple, Jr., Houston, Tex., and Norbert J. Foecking, Cleveland, Ohio, assignors to Shell Development Company, New York, N. Y., a corporation of Delaware Application July 1, 1954, Serial No. 440,776

7 Claims. (Cl. 202—67)

This invention relates to a distillation process for the separation of components of a mixture which are normally difficult to separate by distillation. More particularly, it relates to an improved distillation process which is carried out in the presence of a solid selective adsorbent for one of the components of the mixture to be separated.

It is well known and practiced to separate vaporizable components of mixtures by distillation. It is also well known to perform such distillations in the presence of an added extraneous agent which effectively modifies the relative vapor pressures of the substances to be separated. In some cases the added agent is separated largely in the overhead vapor stream together with the substance whose relative vapor pressure has been substantially reduced, as in azeotropic distillation processes. In other cases the added agent is a relatively high boiling selective solvent for one of the components, as in extractive distillation processes. Both azeotropic distillation and extractive distillation have found considerable favor in industrial processes since they are readily applicable effective modifications of simple fractional distillation processes, whether of the batch type or of the continuous type of operation. In both cases the extraneous agent is a liquid which is handled as such or as a vapor a portion of the time, thereby requiring no more than additional liquid separating and handling equipment. It has been proposed to carry out vapor-phase-liquid phase separations, including distillation, in the presence of solid substances which have been added for the purpose of altering the relative vapor pressures of the substances to be separated. However, unlike in azeotropic and extractive distillations, the use of a solid modifying agent introduces factors of processing and handling which are foreign to the usual fractional distillation, including azeotropic and extractive, namely, the recovery, separation and recycling of the solid material.

It is a principal object of the present invention to provide an improved distillation process for the separation of difficultly separable components from mixtures thereof. A more specific object is to provide an improved distillation process wherein the relative volatilities of the components to be separated are modified by the presence of a selective adsorbent. A still more specific object is to provide an improved adsorptive distillation process, and particularly one in which the mixture to be separated is delivered in a continuous manner to a fractional distillation zone from which overhead vapor and bottom condensed phases are continuously withdrawn and the separation efficiency is improved by continuously flowing a finely divided solid adsorbent downwardly through the distillation zone. Another object of the invention is to provide such a process which is improved with respect to the handling of the solid adsorbent, including its passage through the distillation zone, its regeneration for reuse and its recycling to the distillation zone. Another object is to provide an improved method for the removal of small proportions of very difficultly separable contaminants from a homogeneous mixture of vaporizable substances.

The foregoing objects will be better understood, and others will become apparent, from the detailed description of the invention which will be made with reference to the accompanying drawing which forms a part of the application, wherein:

Figure I is a diagrammatic flow plan of the general process to be followed in the practice of the invention; and Figure II is a diagrammatic flow plan of a more preferred process to be used in the practice of the invention.

Now, in accordance with the broad aspect of the present invention, it has been found that a mixture of substances having closely similar boiling points can be separated more effectively in a distillation operation by fractionally distilling the mixture while countercurrently contacting it simultaneously with a finely divided solid adsorbent, which has a selective adsorptive power for one of the substances, and a substantial proportion of a substantially higher boiling liquid which does not reverse the adsorptive selectivity of the adsorbent for the components of the mixture.

Thus, as applied to the separation of, for example, toluene and similarly boiling non-aromatic, such as paraffinic hydrocarbons, in a narrow boiling range hydrocarbon fraction consisting essentially of such hydrocarbons, the mixture is suitably fed as a continuous stream to an intermediate section of a fractional distillation zone, which is maintained under vapor phase-liquid phase fractionating conditions for the mixture, and a slurry of a finely divided solid adsorbent, such as silica gel, and a higher boiling, essentially non-aromatic, paraffinic hydrocarbon oil, such as a highly paraffinic fraction separated from a paraffinic gas oil having an initial boiling point substantially above the final boiling point of the mixture to be separated, e. g. 50° C. or more, is supplied to an upper section of the distillation zone and permitted to gravitate downwardly countercurrently to the mixture being separated. The slurry gravitates through the adsorption-rectification section between the two thus-defined feed points and then through a partial stripping zone between the feed mixture inlet and the bottom outlet points. The non-aromatic hydrocarbons are separated as an overhead vapor stream and the toluene is separated in the condensed stream withdrawn from the bottom of the fractionation zone, as adsorbate on the adsorbent, together with the adsorbent and the high boiling paraffinic oil.

Thus, although the high boiling paraffins are more readily adsorbed by the adsorbent than the lower boiling paraffins of the mixture to be separated, and it might be expected that the toluene would be no longer sufficiently selectively adsorbed to effect the desired separation, it has been found that the desired separation is still readily effected. At the same time, whereas the amount of solid adsorbent is relatively large, based on the toluene involved, so that in the absence of a suitable liquid carrier it is necessary to handle an essentially solid mass as a bottoms product, the use of a suitable amount of the higher boiling paraffin oil provides an easily handled fluid bottoms stream.

The bottoms product stream, from what may be called the adsorptive distillation zone, comprising the adsorbent, selectively adsorbed adsorbate and higher boiling liquid carrier, is then transported to a stripping zone wherein it is subjected to stripping conditions selected to effect the recovery of the adsorbate and to regenerate the slurry of adsorbent and liquid carrier. In general, this is done by passing the material downwardly through a distillation zone which is supplied with sufficient heat to distill the adsorbate from the adsorbent. An inert gas or vaporous material of substantially lower boiling point than the adsorbate may be suitably used, alone or with the heating, to strip out the adsorbate. The recovered, stripped or regenerated slurry of adsorbent and liquid carrier is then recycled to the adsorptive distillation operation. Any of the liquid carrier which is removed with adsorbate from the stripping zone is readily separated in a dephlegmation zone or a fractionation operation, and thence recycled for further use in the process. The transportation of the adsorbent is advantageously effected by pumping it as a stream in an excess of the liquid carrier. The excess of liquid carrier may be admixed with the adsorbent only during the transportation operation from distillation zone to stripping zone and from stripping zone to distillation zone, during only one of these transportation steps, or it may be admixed with the adsorbent throughout the entire operation.

Low boiling paraffins, such as propane, butane and pentane are suitable materials to be used as stripping agents to remove aromatic adsorbates. They are then readily separated from the recovered aromatics by simple distillation. Such hydrocarbons are also effective for introducing into the lower part of the adsorptive distillation zone to improve the stripping of the feed mixture paraffins from the condensed phase(s) of the system. They are then removed in the overhead vapor stream and are readily separated from the feed mixture non-aromatics by a simple fractionation, after which they can be returned to the adsorptive distillation zone.

Instead of utilizing light paraffins for stripping in the stripping section of the adsorptive distillation zone, a portion of the adsorbate aromatics recovered in the process can be injected into the bottom of that zone whereby the concentration of selectively adsorbed component (aromatics) is increased and the other feed mixture components (paraffins) still present are effectively displaced upwardly in the zone.

The fact that aromatic hydrocarbons are still effectively selectively adsorbed even with respect to higher boiling paraffin hydrocarbons, under refluxing of distillation conditions, and particularly in a system which contains an amount of solid adsorbent which is several-fold the amount (weight) of the aromatic, and yet contains a major proportion of the paraffin hydrocarbon sufficient to maintain a substantially liquid system, is demonstrated by the following: A mixture of 8.66 parts by weight of toluene and 64.7 parts by weight of n-decane (10% v. toluene) was boiled under a reflux condenser. A sample of liquid which was withdrawn carefully from the still after equilibrium was reached had a refractive index of 1.4185. Then fifty parts by weight of silica gel was added and the mixture again refluxed until equilibrium was reached. A further liquid sample was carefully withdrawn, excluding any gel particles from the sample. The refractive index of this sample was 1.4158. A repetition of the operation gave essentially identical results. From the refractive index of toluene (1.4940) and the refractive index of n-decane (1.4119), it is readily calculated that the final concentration of toluene in the liquid was about 5.9% by volume, whereas the original liquid composition was 10% by volume toluene. Thus, it is to be seen that there was a substantial preference of the gel for adsorbing toluene rather than even the higher boiling n-decane under the distillation conditions, in this single-stage evaluation. Even in the presence of the higher boiling paraffin, under conditions of distillation of a substantially lower boiling mixture of aromatics and non-aromatics, the aromatics are effectively selectively adsorbed so that in multiple-stage distillation the similarly boiling non-aromatics are readily separated as a vapor phase stream from the aromatics as adsorbate on the adsorbent slurried in the higher boiling paraffin.

The process of the invention is preferably applied to distillation cuts or mixtures, the components of which distill within a narrow range. It is particularly directed to the separation of fractions whose boiling ranges are narrow enough that the decrease in volatility of the more adsorbed component is sufficient to make it less volatile than the highest boiling non-adsorbed component. Typical separations which can be made are toluene from lower boiling contaminants such as may exist in the 200–235° F. boiling range fraction from virgin naphthas; or from fractions of catalytically reformed naphthas; olefins from narrow boiling naphtha fractions, e. g. $C_6$ olefins from 140°–160° F. fractions from thermally or catalytically cracked naphthas, and the separation of paraffinic hydrocarbons from their more highly branched isomers. In addition to the separation of hydrocarbons, the invention is applicable to the separation of relatively narrow boiling fractions or mixtures of other organic compounds, such as mixtures of various types of oxygenated compounds produced in the Fischer-Tropsch process, mixtures of isomeric polar organic compounds of the same class or type, such as mixtures of isomeric alcohols produced by the hydration of mixtures of isomeric olefinic hydrocarbons, e. g. the isomeric butanols, mixtures of isomeric alkylphenols, such as petroleum cresylic acid mixtures comprising isomeric methyl phenols, such as o-, m- and p-cresols, the isomeric xylenols, and the like, mixtures of closely boiling nitrogeneous bases, such as alkylpyridines and alkylpyrroles as are obtainable from petroleum sources and coal tar sources and shale oil sources. Although the process is generally applied to mixtures of components of relatively similar chemical type, it is also applicable to mixtures of widely different types, such as mixtures of hydrocarbons and oxygenated materials as recovered from the Fischer-Tropsch process. The process of the invention is advantageously applicable to purifications which require the removal of relatively small amounts of adsorbate, thus reducing the amount of adsorbent circulated. Examples of such processes are the removal of impurities from paraffinic materials or from organic substances such as ethanol. Thus, the process can be used for the removal of water from the ethanol-water azeotrope to produce absolute alcohol; here the carrier liquid is suitably a higher boiling alcohol, such as tertiary butyl alcohol, tertiary amyl alcohol, and the like, or a ketone such as methyl ethyl ketone.

Suitable adsorbents for the practice of the invention include silica gel, activated carbon, activated alumina, bauxite or mixtures thereof. The quantity of adsorbent required to be introduced continuously at the upper part of the adsorptive-distillation zone depends in part on the desired degree of separation and recovery of the various components of the feed mixture. In general, the ratio of solid adsorbent to feed is greater than unity. Expressed another way, it should be at least twice the amount of the component which is to be separated as adsorbate, and preferably at least about 400% of the material to be removed as adsorbate.

The higher boiling liquid carrier which is used in the practice of the invention may be selected from various classes of substances. In general, it is preferable that it is a stable organic liquid which has an initial boiling point at least about 25° C. and preferably 40–50° C. above the boiling point of the highest boiling component of the feed mixture which is to be separated as adsorbate. There is no particular limitation to be placed on the upper boiling point, so long as it is sufficiently fluid at the lowest temperature to which it is to be subjected in the process. Also, in general the carrier liquid is selected for a given operation in connection with the separation of a given mixture so that its presence with the solid adsorbent does not reverse the adsorptive selectivity of the adsorbent for the mixture components. It is usually preferable that the higher boiling liquid is chemically non-reactive with the other components of the system and preferably is of the same type of compound as the component of the feed which is less readily adsorbed by the given adsorbent, so that it will not tend to lower the power with which the adsorbent adsorbs the other feed components. However, the higher boiling liquid may be a selective solvent itself for the same component which is selectively adsorbed by the adsorbent, thereby providing additional separating potential, even though this selective solvent itself usually will be more readily adsorbed than would the non-selective solvent type. In the case of the separation of aromatic and non-aromatic hydrocarbon mixtures, the higher boiling liquid is suitably chosen from mixtures of paraffin hydrocarbons. The higher boiling liquid will generally be utilized in proportions at least about 100% of the weight of the adsorbent, although in some cases it can be as low as 50% in the contacting zones. However, it will usually be at least 200% in the streams being pumped in transportation and preferably at least 300%, with higher proportions such as 500–1000% being particularly useful.

The general application of the process of the invention will be described in greater detail with reference to Figure I. The mixture of similarly vaporizable substances, referred to as the feed mixture, is delivered, either in vapor phase or in liquid phase or as mixed vapor-liquid phases, by line 11 to an intermediate section of a suitable fractionator-adsorber 12, wherein it is subjected to vapor phase-condensed phase multiple-stage fractionation under refluxing conditions while being countercurrently contacted with a substantial proportion of a finely divided solid adsorbent which exhibits a greater adsorbent power for one of the components, or group thereof, of the mixture than for another one or group of components, and with a substantially higher boiling liquid which does not reverse the adsorptive selectivity of the adsorbent for the components of the mixture, which liquid itself preferably is not selectively adsorbed with respect to the more selectively adsorbed component of the mixture. The slurry of adsorbent (taken from storage 14) and higher boiling liquid (taken from storage 15), suitably formed in mixer and surge tank 16, is delivered to a point in the upper part of the fractionator-adsorber by means of reflux line 17 and/or line 19. The overhead vapor stream is condensed, at least partially, in condenser 20, collected in surge vessel 21, and withdrawn by line 22, except for the portion which is returned as reflux by line 17. The fractionator 12 is supplied with suitable contacting means, such as fixed randomly disposed packing, bubble-cap trays with downcomers, disc-and-donut assemblies, cooperating angularly disposed vapor-phase-condensed phase contacting means such as perforated trays, grid trays, and the like, as well as with suitable heating or reboiling means and any desired cooling or condensing means. The feed mixture is subjected to an adsorptive-distillation rectification in zone A of column 12 and to a stripping rectification in zone B. When the ratio of more readily adsorbed feed component in less readily adsorbed feed component is substantially less than unity, it is often advantageous to add a further portion of the carrier liquid to the lower section B of the column, as by valved line 18, in order to maintain more suitable fluidity. The slurry of adsorbent and higher boiling liquid together with the adsorbate adsorbed on the adsorbent is removed continuously as a fluid slurry stream from the bottom of the fractionator 12, and is pumped by a suitable pump 24 and line 25 to a suitable stripper 26. The stream is suitably heated partially by exchange in heat exchanger 27 against recycling regenerated slurry. It may be heated further, if desired, in any suitable heat transfer equipment or furnace 29. Still further heat for stripping may be supplied in stripper 26 by means of heater coil 30. The fluid stream is readily stripped by supplying it to the upper part of the stripper and subjecting it in the stripper to stripping conditions under essentially reflux conditions, with desorption and removal of the adsorbate as an overhead vapor stream, generally admixed with a portion of the carrier liquid. Alternatively, the stream is heated sufficiently in heater or exchanger 29, and if desired while providing substantial superatmospheric pressure by pump 24, and then is flashed into a lower section of stripper 26 under conditions which effect a substantially complete desorption and removal of the adsorbate, together with a portion of the carrier liquid. The stripping in either case is effectively aided by means of a stream of a low boiling desorbing vapor stream, injected by means of line 31. The overhead from the stripper 26 is fractionated in fractionator 32, with the separation of the stripping medium as a top product stream in line 34, which may be recycled to line 31, the selectively adsorbed component of the original feed mixture, the adsorbate, in line 35 and the carrier liquid carryover as bottoms liquid in line 36. A portion of the carrier liquid in line 36 can be returned to stripper 26 as reflux, if desired. The remainder is recycled to either or both of the slurry streams taken from the bottoms of columns 12 and/or 26. The stripped and thus regenerated adsorbent resulting from the stripping in stripper 26 is taken by the suction side of pump 37 and returned thereby, together with recycled recovered carrier liquid from line 36, through line 39, heat exchanger 27 and supplementary cooler 40 to the slurry tank 16, whence it is returned to fractionator 12. A substantial proportion, at least 25% and up to 75%, of the carrier liquid is preferably separated from the adsorbent in slurry tank 16, by partial settling and stratification, and this portion is delivered to the bottoms stream from fractionator 12 on the suction side of pump 24, thereby supplying the desired fluidity to the bottoms stream and at the same time by-passing the fractionator 12, thus materially reducing its required size for a given feed stream, or increasing its feed throughput for a given desired separation. Continuous or intermittent withdrawal of a bleed portion of the regenerated adsorbent stream is readily made as required by line 38 and make-up adsorbent and carrier liquid are supplied from storage.

Figure II illustrates a second and preferred embodiment of the invention, the process thereof being rather similar to that of Figure I, but with the incorporation of further refinements. The practice of the invention as carried out in accordance with the process as illustrated in Figure II will be described in connection with the separation of a light reformed naphtha charge stock boiling in the range corresponding to $C_6$—$C_8$ hydrocarbons, and comprising essentially aromatic and paraffinic hydrocarbons, such as a platformate containing benzene, toluene and xylenes and similarly boiling non-aromatics, principally paraffins.

A vaporized reformate, which may contain about 35% v. aromatics, is fed as a continuous stream through line 51 to fractionator-adsorber 52, wherein it is subjected to multiple-stage vapor phase-condensed phase fractionation, in the presence of a downwardly moving mass of finely divided solid selective adsorbent such as silica gel, and a high boiling, essentially aromatic-free, hydrocarbon liquid, being a gas oil fraction having a boiling range of about 190° C. to 250° C. and having been previously refined to remove aromatic hydrocarbons, as by treatment with an excess of silica gel to essentially completely dearomatize it. The solid adsorbent is supplied in an amount of from about 500% to about 3000%, preferably about 1000 to 1500% by weight of the aromatic to be recovered thereby and the paraffinic gas oil is supplied in an amount sufficient at least to thoroughly wet the silica gel and to form a fluid mass therewith, generally being at least about equal in weight to the silica gel, and ranging as high as about five times the weight of the silica gel, a suitable proportion being a weight ratio of from about 1:1 to about 2:1. The silica gel is supplied from storage 54, the gas oil from storage 55, the slurry being prepared in and supplied from surge vessel 56, and delivered to fractionator 52 by line 57.

A relatively small stream of light paraffins, such as pentanes obtained in the depentanizing of feed naphtha to the reforming (platforming) operation, is suitably injected by line 59 into the lower part of the fractionator 52, in order to improve the stripping rectification in the lower section of the fractionator. By "stripping rectification" is meant the removing of non-aromatics from the bottom effluent. The non-aromatic hydrocarbons in the feed stream, together with the pentanes used for stripping, are removed as overhead stream in line 60. The feed stream components are separated from the pentanes by fractionation in fractionator 61, with the pentanes being recycled by line 62 to line 59, and the condensed feed components being withdrawn through line 64, a portion being returned by line 65 as reflux to column 52.

A portion of the mixed aromatics recovered in the process, or a portion of one of the aromatics separated from the others by fractionation, is suitably injected into the bottom of the fractionator 52, together with the light paraffins, or it may be injected in lieu thereof, for the purpose already set forth, as by means of line 66. The bottoms stream of adsorbent, adsorbate and high boiling carrier gas oil is withdrawn through line 67, admixed on the suction side of pump 69 with a further auxiliary portion of the same gas oil taken from surge 70 by line 71, sufficient to increase the fluidity materially and thereby improve the pumpability, is pumped under suitable pressure through line 72 to the tangential inlet of a cyclone separator 74, wherein essentially the auxiliary portion of gas oil is separated as overhead in line 75 while the thickened slurry is withdrawn through line 76. The material in line 76 is then stripped in stripper 79, with the removal as overhead in line 80 of adsorbate aromatics, pentanes stripping medium (introduced by line 81) and a portion of the gas oil. The overhead stream is separated in fractionator 82, to separate the pentanes stripping material as overhead, which is suitably recycled by line 84, the aromatics as a side stream in line 85, a portion of which is recycled as backwash to fractionator 52 by means of line 66, and the carryover gas oil as a bottoms stream in line 86, a portion of which is returned as reflux by line 89, the net amount being recycled by lines 90 and 91 to adsorbent slurry streams. The regenerated adsorbent admixed with a portion of the gas oil is withdrawn from the bottom of the stripper 79, by line 92, admixed with the auxiliary portion of gas oil in line 75 from cyclone 74, on the suction side of pump 94, and transferred through line 95 and suitable cooler 96 to a cyclone separator 97. The auxiliary portion of gas oil is separated and removed by line 99, while the remainder of the slurry is passed to the mixing and surge tank 56, the separated gas oil in line 99 being passed to surge tank 70 for recycling in the process. A portion of the slurry removed from the stripper 79 is suitably withdrawn continuously or intermittently from line 92 by valved line 93 and replaced by makeup adsorbent and gas oil from storage, in order to maintain contaminants content at a suitable low value. This withdrawn adsorbent is advantageously employed for the treatment of gas oil distillates for the removal of aromatics therefrom, to produce the non-aromatic gas oil to be used in the process.

We claim as our invention:

1. The method of separating organic substances which form close-boiling mixtures difficult to separate by ordinary fractional distillation, which comprises adsorptively distilling a feed mixture of said substances while contacting it with a descending countercurrently flowing slurry of a solid adsorbent and at least an equal proportion of liquid which is at least 25° C. higher boiling than the end boiling point of the mixture of organic substances and which is of the same chemical class as the one of the organic substances which is less readily adsorbed by the adsorbent, and continuously removing an overhead vapor stream of the relatively more volatile and less readily adsorbed one of said substances in the resulting system and removing a slurry of the solid adsorbent, containing as adsorbate the relatively less volatile one of said substances, in slurry admixture with said higher boiling liquid.

2. The method in accordance with claim 1, wherein the slurry removed from the adsorptive-distillation is then subjected to stripping conditions whereby the adsorbate is removed as a vapor stream from a regenerated slurry of the adsorbent and at least a portion of the higher boiling liquid, and the regenerated slurry is recycled to the adsorptive-distillation operation for further utility therein.

3. The method in accordance with claim 1, wherein a further auxiliary portion of said higher boiling liquid is admixed with the slurry removed from the adsorptive-distillation, the resulting slurry is pumped as a stream to a first gravitational separation zone and the auxiliary portion of the higher boiling liquid is separated therein from the remainder of the slurry, said remainder is then subjected to stripping conditions whereby the adsorbate is removed as a vapor stream from a regenerated slurry of the adsorbent and at least a portion of the higher boiling liquid, the auxiliary portion of higher boiling liquid separated in the first gravitational separation zone is combined with the resulting stripped slurry of adsorbent and higher boiling liquid and the resulting slurry is pumped as a stream to a second gravitational separation zone wherein the auxiliary portion of the higher boiling liquid is separated from the regenerated slurry, and both separated portions are recycled to the process as described hereinbefore.

4. The method of separating hydrocarbons which form close-boiling mixtures difficult to separate by ordinary fractional distillation, which comprises continuously introducing a feed mixture of said hydrocarbons to a fractional distillation zone wherein vapors of said hydrocarbons ascend countercurrently to a descending slurry of a solid adsorbent and at least an equal proportion of a paraffin hydrocarbon mixture having an initial boiling point at least 25° C. higher than the end boiling point of said mixture to effect vaporization of the hydrocarbon component rendered relatively more volatile, continuously removing vapor of the relatively more volatile hydrocarbon component overhead from the fractional distillation zone, and removing a slurry of the solid adsorbent, containing the relatively less volatile hydrocarbon component of the mixture as adsorbate, in slurry admixture with said higher boiling paraffin hydrocarbon.

5. The method in accordance with claim 4, wherein the slurry removed from the adsorptive-distillation is then subjected to stripping conditions whereby the adsorbate is removed as a vapor stream from a regenerated slurry of the adsorbent and at least a portion of the higher boiling paraffin hydrocarbon mixture, and the regenerated slurry is recycled to the adsorptive-distillation operation for further utility therein.

6. The method in accordance with claim 4, wherein a further auxiliary portion of said higher boiling paraffin hydrocarbon mixture is admixed with the slurry removed from the adsorptive-distillation, the resulting slurry is pumped as a stream to a first gravitational separation zone and the auxiliary portion of the higher boiling paraffin hydrocarbon mixture is separated therein from the remainder of the slurry, said remainder is then subjected to stripping conditions whereby the adsorbate is removed as a vapor stream from a regenerated slurry of the adsorbent and at least a portion of the higher boiling paraffin hydrocarbon mixture, the auxiliary portion of higher boiling paraffin hydrocarbon mixture separated in the first gravitational separation zone is combined with the resulting stripped slurry of adsorbent and higher boiling paraffin hydrocarbon mixture and the resulting slurry is pumped as a stream to a second gravitational separation zone wherein the auxiliary portion of the higher boiling paraffin hydrocarbon mixture is separated from the regenerated slurry, and both separated portions are recycled to the process as described hereinbefore.

7. The method in accordance with claim 6, wherein the close boiling hydrocarbon mixture is a light reformed naphtha charge comprising essentially aromatic and paraffinic hydrocarbons, the solid adsorbent is silica gel in an amount at least about 500% based on the naphtha charge ffinic hydrocarbons, the solid adsorbent is silica gel in an essentially non-aromatic petroleum gas oil fraction in an amount at least equal to the amount of the silica gel.

References Cited in the file of this patent

UNITED STATES PATENTS

| | | |
|---|---|---|
| 1,350,254 | Frankforter | Aug. 17, 1920 |
| 1,982,989 | Gorhan | Dec. 4, 1934 |
| 2,665,315 | Herbst | Jan. 5, 1954 |
| 2,666,500 | Cohn et al. | Jan. 19, 1954 |
| 2,678,111 | Ogorzaly | May 11, 1954 |
| 2,685,607 | Beacon et al. | Aug. 3, 1954 |